United States Patent
Enomoto et al.

(10) Patent No.: US 7,665,624 B2
(45) Date of Patent: Feb. 23, 2010

(54) GASKET AND TANK OPENING-CLOSING DEVICE

(75) Inventors: Kentaro Enomoto, Aichi-ken (JP); Hiroyuki Hagano, Aichi-ken (JP); Masayuki Nakagawa, Aichi-ken (JP); Eishin Mori, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 342 days.

(21) Appl. No.: 11/642,946

(22) Filed: Dec. 21, 2006

(65) Prior Publication Data
US 2007/0145056 A1    Jun. 28, 2007

(30) Foreign Application Priority Data
Dec. 28, 2005 (JP) ............... 2005-377686
Sep. 28, 2006 (JP) ............... 2006-264996

(51) Int. Cl.
*B65D 53/00* (2006.01)
*B65D 41/04* (2006.01)
(52) U.S. Cl. ............... 220/304; 220/378; 220/DIG. 33
(58) Field of Classification Search ............... 220/304, 220/378, DIG. 33
See application file for complete search history.

(56) References Cited

U.S. PATENT DOCUMENTS

| 4,072,245 | A | | 2/1978 | Sloan, Jr. | |
| 4,102,472 | A | | 7/1978 | Sloan, Jr. | |
| 5,238,136 | A | * | 8/1993 | Kasugai et al. | 220/304 |
| 5,732,840 | A | * | 3/1998 | Foltz | 220/86.2 |
| 7,278,547 | B2 | | 10/2007 | Hagano et al. | |
| 2005/0115971 | A1 | * | 6/2005 | Hagano | 220/304 |

FOREIGN PATENT DOCUMENTS

| JP | A-53-20054 | | 2/1978 |
| JP | 04300726 A | * | 10/1992 |

* cited by examiner

*Primary Examiner*—Anthony Stashick
*Assistant Examiner*—James N Smalley
(74) *Attorney, Agent, or Firm*—Posz Law Group, PLC

(57) ABSTRACT

The gasket is interposed between the seal face and the seal retaining portion of the fuel cap. The gasket has a first lip for pressing against the seal face, a second lip for pressing against the seal retaining portion, and a connecting portion connecting the first lip with the second lip; and is formed with a C-shaped cross section. An assist rib projects from the inside face of the second lip. The assist rib is formed so as to press the distal edge of the first lip towards the seal face.

11 Claims, 9 Drawing Sheets

GASKET AND TANK OPENING-CLOSING DEVICE

This application claims the benefit of and priority from Japanese Application No. 2005-377686 filed Dec. 28, 2005, and Japanese Application No. 2006-264996 filed Sep. 28, 2006, the contents of which are incorporated herein by reference.

BACKGROUND OF THE INVENTION

1. Field of the Invention

The present invention relates to a gasket adapted to be interposed between a tank opening and a cap, and to a tank cap and tank opening-closing device employing the gasket.

2. Description of the Related Art

A tank cap of this kind known to date is an automotive fuel cap for closing a tank opening, with a closure body having a gasket of C-shaped cross section installed thereon, adapted to be screwed into a thread on the inside wall of the filler pipe (JP-A 53-20054). With the aim of improving ease of operation of this kind of fuel cap, it has been contemplated to reduce the tightening torque while assuring at a minimum a prescribed level of seal face pressure. As one technology for accomplishing this, it has been contemplated to reduce the area of contact of the gasket with the seal face of the tank opening (JP-A 2005-153661).

However, reducing the contact area produces the following problem. In recent years, it has been contemplated to switch from iron to stainless steel as the material for the filler pipe in order to improve corrosion resistance. With stainless steel filler pipes, when the rim of the mouth is produced through press forming, the seal face FNf tends to have a rough surface, owing to the workability of the material. If the contact area of the gasket with such a rough seal face is reduced, the problem of a loss of seal may result.

SUMMARY

An advantage of some aspects of the invention is provided with a gasket affording high sealing ability even in instances where the seal face at the rim of the tank opening is a rough surface; as well as a tank cap and tank opening-closing device employing the same.

According to an aspect of the invention is provided with an annular gasket that is pressed between a seal retaining portion and a seal face. The gasket comprises a gasket body having a first lip pressed by the seal face, a second lip pressed by the seal retaining portion, and a connecting portion integrally connecting the first lip with the second lip, and an assist rib projecting from the gasket body. The assist rib is configured such that the assist rib presses and elastically deforms the first lip, and then a distal edge of the first lip comes into contact with the seal face when the gasket body is compressed between the seal retaining portion and the seal face.

In the operation of closing the tank cap which pertains to the present invention, in the initial phase of tightening in which the deflection of the gasket is still low, the first lip is in abutment against the seal face; with further tightening the gasket becomes compressed in the deflection direction, while the gap between the first lip and the second lip narrows. Then, the assist rib presses against the distal edge of the first lip, bringing about elastic deformation of the first lip so as to expand the planar area thereof contacting the seal face. Then, with the first lip pressed firmly against the seal face, the tank cap closes off the tank opening. That is, because the contact area of the first lip against the seal face increases as the gasket progressively deflects, high sealing can be achieved even where the seal face is a rough surface. Moreover, since only the assist rib projects out while the first lip and second lip are not made very thick, there is no increase in the force inducing deflection in the gasket.

In a preferred embodiment of the present invention, the assist rib can be adapted to have a pressing face formed substantially parallel to the seal face and pressed by the first lip or second lip. By means of this arrangement, since the pressing face induces the first lip to undergo elastic deformation parallel to the seal face, the force inducing the first lip to undergo elastic deformation represents a high level of force applied from the orthogonal direction from the assist rib, and the seal area can be increased further without any increase in force inducing deflection in the gasket.

In another preferred embodiment of the present invention, a gap permitting radial direction deformation of the gasket body can be provided between the connecting portion and the seal retaining portion. By means of this arrangement, when the gasket receives force in the deflection direction, it can undergo elastic deformation so as to fill the gap at a low level of force.

In a preferred embodiment for the gasket pertaining to the present invention, the assist rib can be integrally formed with the gasket body, or formed as a separate member from the gasket body.

As yet another preferred embodiment of the invention pertaining to a tank cap employing the gasket described above, the invention may be implemented in a tank cap wherein the closure member has a cap body detachable from the tank opening forming member; and the cap body has a seal retaining portion for holding the gasket so as to press against the seal face of the tank opening forming member.

As yet another preferred embodiment of the invention, the invention may be implemented in a tank opening-closing device furnished with a closure member detachable from the tank opening forming member, rather than a cap detachable from the tank opening forming member.

Specifically, the tank opening-closing device may be furnished with an arrangement wherein the tank opening forming member is disposed at the periphery of the tank opening and has a seal retaining portion for holding the gasket; and wherein the closure member is a valve opening-closing mechanism having a valve body for opening-closing the tank opening and detachably supported on the tank opening forming member, and a seal portion disposed on the valve body for pressing the gasket. The tank opening-closing device may also be furnished with an arrangement wherein the tank opening forming member has a seal face at the periphery of the tank opening; and wherein the opening-closing member has a valve opening-closing mechanism having a valve body for opening-closing the tank opening and detachably supported on the tank opening forming member, and a seal retaining portion disposed on the valve body for holding the gasket.

These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment (1) Simple Arrangement and Operation of a Fuel Cap 10

Figure 1:
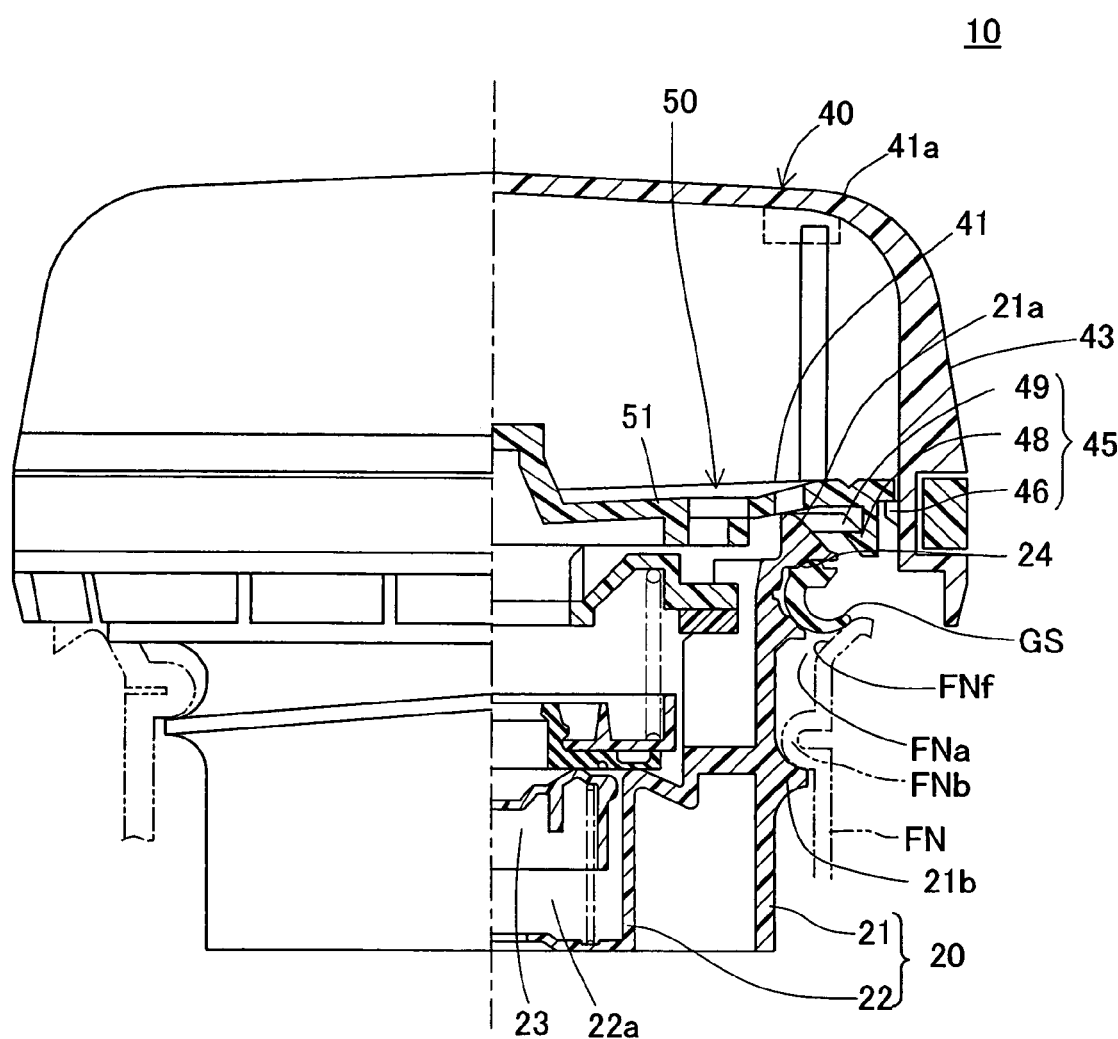
FIG. 1 is a half-sectional view showing a cap device furnished with a fuel cap pertaining to a first embodiment of the invention.

FIG. 1 is a half-sectional view depicting a cap device furnished with the fuel cap 10 (closure member) pertaining to a first embodiment of the invention. In FIG. 1, the fuel cap 10 is intended for installation in a filler neck FN having an inlet FNa for replenishing fuel to a fuel tank, not shown. The fuel cap 10 comprises a casing body 20 (cap body) constructed of a synthetic resin material such as polyacetal; a cover body 40 mounted on the upper part of the casing body 20 and constructed of a synthetic resin material such as nylon; a torque mechanism 50 such as a ratchet mechanism for transmitting rotary torque directed in the closure direction from the cover body 40 within a prescribed range; and an annular gasket GS installed about the periphery of the upper part of the casing body 20, for providing sealing between the casing body 20 and the filler neck FN (tank opening forming member). The filler neck FN has been subjected to plastic working to trumpet shape by means of press forming of pipe.

Next, the arrangement of each component of the fuel cap 10 pertaining to the embodiment shall be discussed. The casing body 20 comprises a substantially round outer tubular body 21, and a valve chamber forming body 22 integrally disposed to the inside of the outer tubular body 21. The valve chamber forming body 22 forms a valve chamber 22a, with a pressure regulating valve 23 being housed within the valve chamber 22a.

The gasket GS is installed externally on the lower face of a flange 21a in the upper part of the casing body 20. The gasket GS is interposed between a seal retaining portion 24 of the flange 21a and the inlet FNa of the filler neck FN; and produces sealing action by being pressed against the seal face FNf of the rim of the fuel neck FN as the fuel cap 10 is twisted into the inlet FNa. The seal retaining portion 24 is formed with a curving face that is curved in cross section so as to retain the gasket GS.

A casing engaging portion 21b is formed on the peripheral lower part of the outer tubular body 21. A mouth-side engaging portion FNb is formed on the inside peripheral part of the filler neck FN. With the fuel cap 10 positioned inserted into the inlet FNa of the filler neck FN, the casing body 20 is turned via the torque mechanism 50 by applying rotary torque in the closure direction to the cover body 40 so that the casing engaging portion 21b engages the mouth-side engaging portion FNb, thereby attaching the fuel cap 10 to the filler neck FN. Here, an angle of 360°, i.e. one full turn. is established for complete closure as the fuel cap 10 is tightened; specifically, the angle up to the point that the first lip GS of the gasket GS comes into contact with the seal face FNf is set to 124°, and the angle up to the point that with further tightening the gasket GS deflects while providing complete closure is set to 236°.

The cover body 40 comprises an upper wall 41 with a projecting handle 41a, and a side wall 43 formed at the outside periphery of the upper wall 41; it is unitarily molded of cup shape and is rotatably mounted on the upper part of the casing body 20 via a cover body engaging mechanism 45. The cover body engaging mechanism 45 comprises cover-side engaging projections 46 projecting from the inner wall of the side wall 43; an engaging claw 48 formed on a torque plate 51 of the torque mechanism 50; and a body-side engaging portion 49 for engaging the engaging claw 48 of the torque plate 51. The cover-side engaging projections 46 are formed at eight locations equally spaced apart around the circumference of the cover body 40. By means of this design of this cover body engaging mechanism 45, the torque plate 51 is attached to the casing body 20 through the agency of the body-side engaging portion 49 of the casing body 20 and the engaging claw 48 of the torque plate 5; and when the cover body 40 is pressed in from above the casing body 20, the outside peripheral portion of the torque plate 51 moves past the cover-side engaging projections 46. By so doing, the cover body 40 becomes rotatably attached to the casing body 20.

With the design of the fuel cap 10 discussed above, by grasping the handle 41a, pushing it into the inlet FNa from below the casing body 20, and in this state turning it in the tightening direction (clockwise direction), the casing body 20 is rotated from the cover body 40 through the agency of the torque mechanism 50 and the casing engaging portion 21b engages the mouth-side engaging portion FNb, thereby attaching the fuel cap 10 the filler neck FN. At this time, the gasket GS is pressed against and compressed by the seal face FNf provided surrounding the inlet FNa, so that the fuel tank interior is sealed off from the outside.

(2) Gasket GS and Seal Retaining Portion 24

(2)-1 Design of Gasket GS

Figure 2:
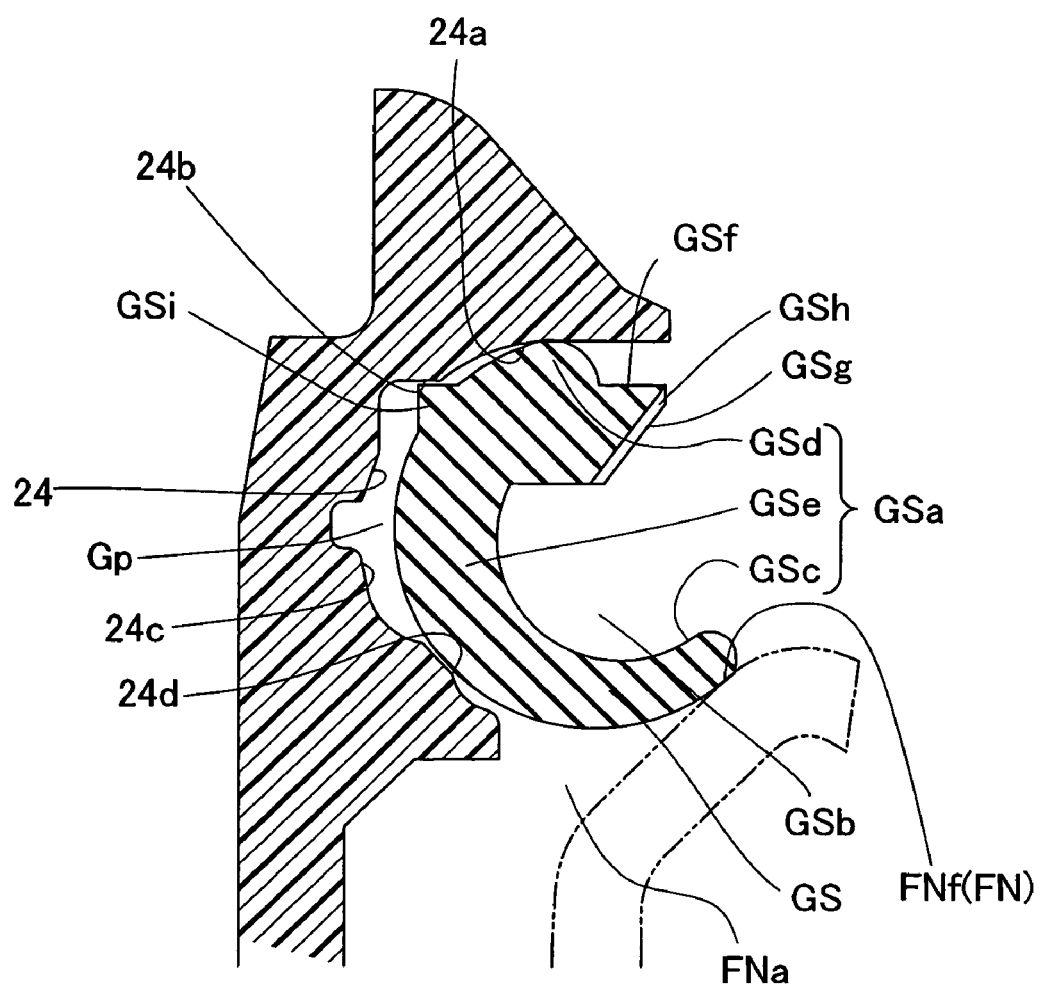
FIG. 2 is an enlarged sectional view showing the area around a gasket installed on a seal retaining portion of the fuel cap.

FIG. 2 is an enlarged sectional view showing the area around the gasket GS installed on the seal retaining portion 24 of the fuel cap. The gasket GS comprises a gasket body GSa fabricated of fluororubber of substantially C-shaped cross section which is compressible so as to become shorter in length in the deflection direction. The gasket body GSa is formed with a C-shaped cross section so as to be encircled by a slit GSb of substantially U-shaped cross section open at the outside edge; that is, the gasket body GSa has a first lip GSc adapted to press against the seal face FNf of the filler neck FN and a second lip GSd adapted to press against the seal retaining portion 24, with the first lip GSc, the second lip GSd, and a connecting portion GSe constituting the C-shaped cross section of the component.

An assist rib GSf projects from the inside peripheral portion of the gasket body GSa, at a region inward from the second lip GSd. The assist rib GSf is furnished with a pressing face GSg that comes into abutment with the inside face of the first lip GSc when the first lip GSc is pressed against the seal face FNf and the gasket GS is compressed. This assist rib GSf is provided at four locations along the circumference with air channels GSh for venting air. A turn-stop portion GSi is formed projecting from the inside peripheral portion of the gasket body GSa, between the second lip GSd and the connecting portion GSe.

(2)-2 Design of Seal Retaining Portion 24

The seal retaining portion 24 mentioned previously is an annular recess supporting the outside peripheral face of the gasket GS, and comprises a first seal wall face 24a supporting the second lip GSd, a stopper shoulder portion 24b functioning as a stopper portion, a second seal wall face 24c, and a seal lower face 24d. The stopper shoulder portion 24b positions the turn-stop portion GSi of the gasket GS and thereby functions as a turn-stop when the first lip GSc is pressed by the seal face FNf. The second seal wall face 24c is formed across a gap Gp from the connecting portion GSe of the gasket GS, and formed so that the gasket GS undergoes elastic deformation constricting the gap Gp when the first lip GSc receives compressive force from the seal face FNf.

Figure 3A:
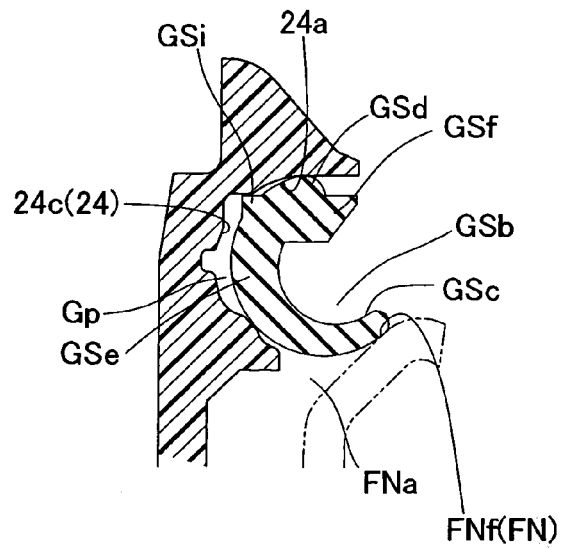
FIGS. 3A, 3B and 3C show the process of compression of the gasket when the fuel cap is tightened.
Figure 3B:
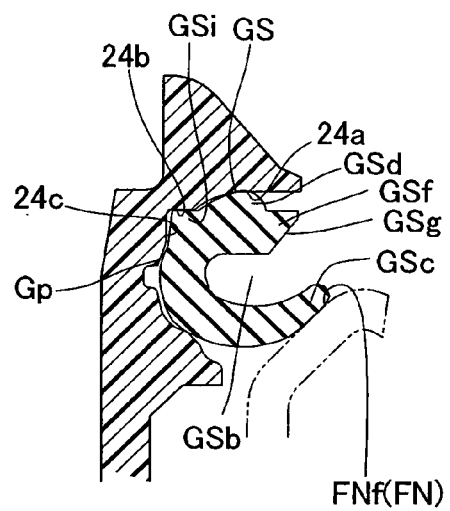

(2)-3 Sealing Action by the Gasket GS FIG. 3 is an illustration showing the process of compression of the gasket GS as the fuel cap 10 is tightened. In the initial phase of tightening the fuel cap 10, the first lip GSc of the gasket GS is in abutment against the seal faced FNf (FIG. 3A); and with further tightening becomes compressed in the deflection direction while constricting the opening of the slit GSb (FIG. 3B). At this time, since the gasket GS is stopped from turning by the turn-stop portion GSi positioned in the stopper shoulder portion 24b, as the first lip GSc is pressed the connecting portion GSe deforms in such a way as to constrict the gap Gp with the second seal wall face 24c.

Figure 3C:
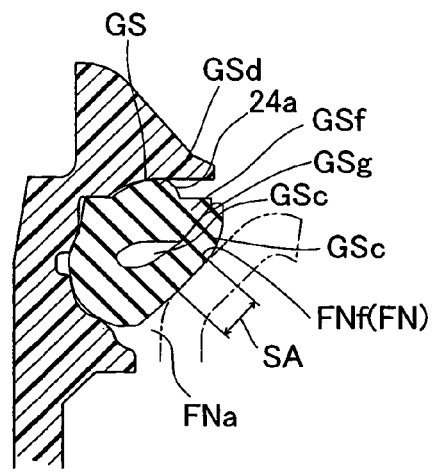

When the pressing face GSg of the assist rib GSf comes into abutment against the inside face at the distal edge of the first lip GSc as depicted in FIG. 3C, the assist rib GSf induces elastic deformation of the first lip GSc so as to expand the area of the first lip GSc contacting the seal face FNf. Then, with the first lip GSc in abutment against the seal face FNf and pressed firmly against the seal face FNf, i.e. with the seal width SA in a wide state, the fuel cap 10 provides closure to the inlet FNa.

Consequently, according to the embodiment discussed above, the area of contact of the first lip GSc against the seal face FNf increases progressively with deflection of the gasket GS, whereby high sealing may be achieved even where the seal face FNf is a rough surface. Moreover, since only the assist rib GSf projects out and the first lip GSc and second lip GSd are not very thick, there is no increase in the force inducing deflection in the gasket GS.

As the fuel cap is tightened, the gasket deflects as the deflection increases, whereby the reaction force thereto increases. Here, deflection refers to the distance of shortening (compression level) of the gasket as it is compressed in the deflection direction. The relationship of deflection to the rotation angle of the fuel cap will be variable due to the effects of parameters such as gasket hardness and shape; however, where the angle from the point that the first lip GSc of the gasket GS contacts the seal face FNf to the fully closed position by one 360° turn of the fuel cap is set to 236°, deflection of 4.0 mm will be produced. With a deflection of 4.0 mm in the fully closed state, in the fuel cap closure operation, tightening torque is 0.74 N, thus affording excellent ease of operation.

Figure 4:
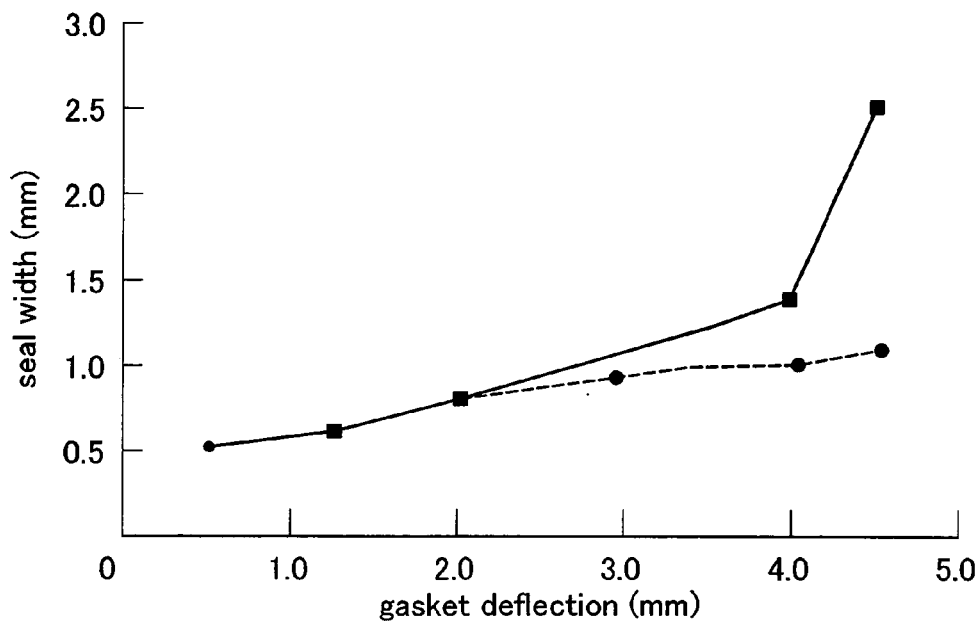
FIG. 4 shows the relationship of gasket deflection and seal width.

FIG. 4 is a graph depicting the relationship of gasket deflection and seal width. Here, as noted earlier, the seal width SA refers to the width over which the first lip GSc shown in FIG. 3C contacts the seal face FNf. In FIG. 4, the solid line represents the gasket of the embodiment, while the broken line represents a gasket having a lip pertaining to the prior art (Patent Citation 2). As shown in FIG. 4, it will be apparent that according to the embodiment, in excess of 2.0 mm, the pressing face GSg of the assist rib GSf presses the first lip GSc towards the seal face FNf, producing a sharp increase in the seal width SA, and affording a 40% improvement in the seal width in the fully closed position at which the deflection is 4.0 mm.

In this embodiment, in order to ensure seal face pressure on part with the gasket of the prior art (Patent Citation 2) as well as to achieve increased seal area through the agency of the assist rib GSf, deflection at completion of tightening should be at least 3.0 mm, preferably 3.5-4.5 mm.

(3) Effects of Gasket GS

The embodiment described above affords the following effects and advantages.

(3)-1 When the pressing face GSg of the assist rib GSf comes into abutment against the inside face at the distal edge of the first lip GSc, the assist rib GSf induces elastic deformation of the first lip GSc so as to expand the area of contact of the first lip GSc against the seal face FNf. Then, with the first lip GSc abutting the seal face FNf and pressed firmly against the seal face FNf, the fuel cap 10 provides closure to the inlet FNa. That is, as the gasket GS progressively deflects the contact area of the first lip GSc against the seal face FNf increases. Consequently, even in the case of a stainless steel filler neck FN produced by press forming whose seal face FNf is a rough surface with grooves or striations in excess of 1 mm, the first lip GSc of the gasket GS will nevertheless come into intimate contact therewith so as to cover the grooves and so on, thereby affording high sealing ability.

Moreover, since the pressing face GSg of the assist rib GSf is formed substantially parallel to the seal face FNf, the first lip GSc is induced to undergo elastic deformation parallel to the seal face FNf, so that the seal area can be increased even further.

(3)-2 Since the gasket GS is designed such that only the assist rib GSf projects out while the first lip GSc and second lip GSd are not very thick, there is no increase in force inducing deflection in the gasket.

(3)-3 Since the gasket GS is positioned in the stopper shoulder portion 24b and stopped from turning by a stopper 21d, and a gap Gp is provided, as the first lip GSc is pressed by the seal face FNf, the connecting portion GSe readily deforms so as to constrict the gap between the second seal wall face 24c and the connecting portion GSe, a high level of seal face pressure is affords by a low level of tightening force, and excellent ease of operation can be afforded as well.

B. Second Embodiment

Figure 5:
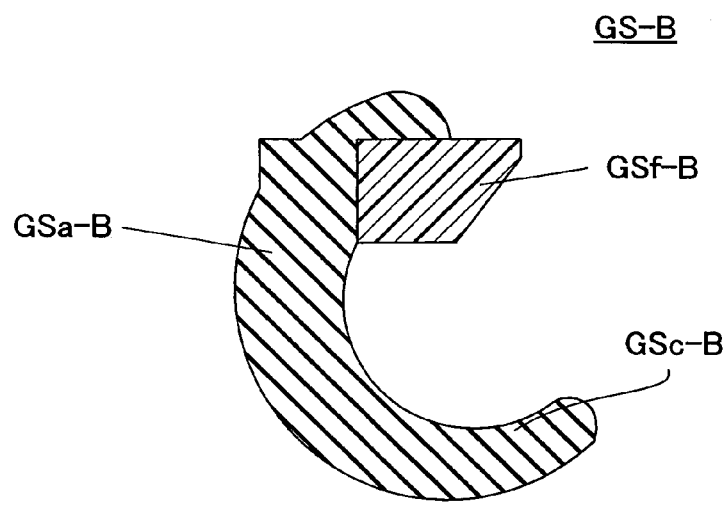
FIG. 5 is a sectional view showing a gasket pertaining to a second embodiment.

FIG. 5 is a sectional view depicting a gasket GS-B pertaining to a second embodiment. The gasket GS-B pertaining to this embodiment features a design in which the gasket body GSa-B and the assist rib GSf-B are constituted as separate elements. Specifically, an adhesive is applied to the surface of the assist rib GSf-B fabricated of resin material, the part is placed in a mold, and then a rubber material is injected to form the gasket body GSa-B while simultaneously integrating it with the assist rib GSf-B by means of vulcanization bonding. This assist rib GSf-B will have higher mechanical strength than rubber, affording a higher level of force deflecting the first lip GSc-B and making it easy to increase the seal width.

C. Third Embodiment

Figure 6:
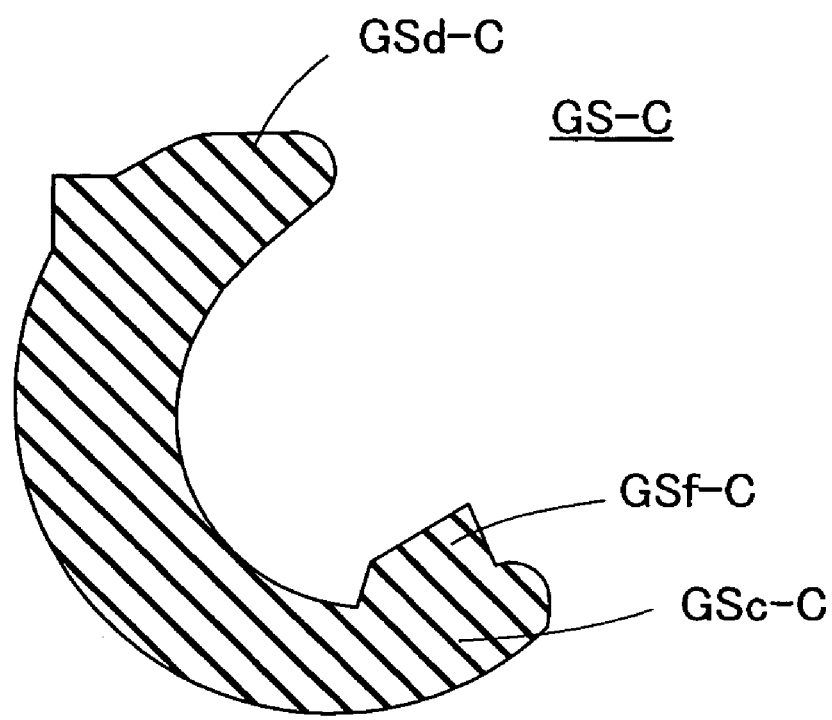
FIG. 6 is a sectional view showing a gasket pertaining to a third embodiment.

FIG. 6 is a sectional view depicting a gasket GS-c pertaining to third embodiment. The gasket GS-C pertaining to this embodiment features a design in which the assist rib GSf-C projects from the inside of the first lip GSc-C. In this way, the location of the assist rib GSf-C may be a region in opposition to the first lip GSf-C, selected so that the seal width afforded by the first lip GSf-C expands by means of being pressed by the second lip GSd-C.

D. Fourth Embodiment

Figure 7:
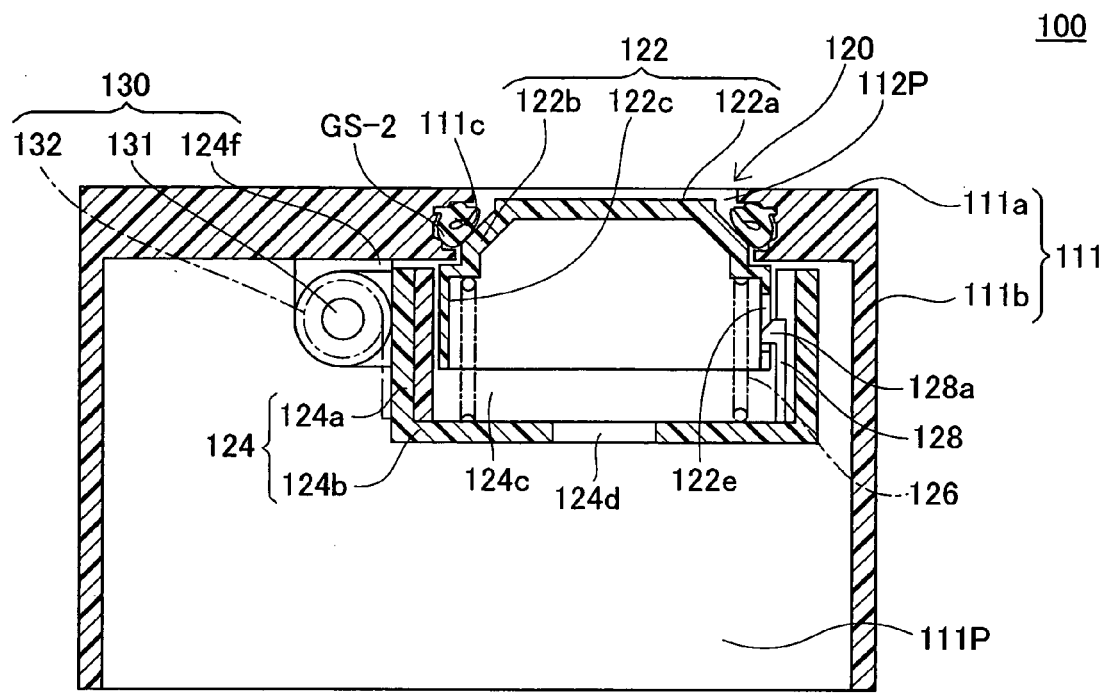
FIG. 7 is a sectional view showing a tank opening-closing device employing the gasket pertaining to a fourth embodiment.
Figure 8:
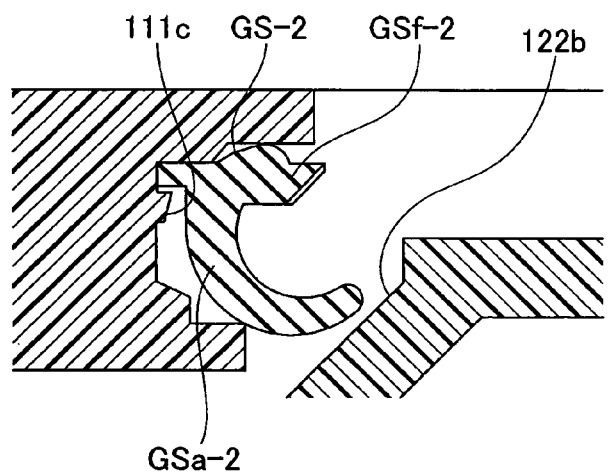
FIG. 8 is an enlarged sectional view showing the area around the gasket.

FIG. 7 is a sectional view showing the design of a tank opening-closing device employing the gasket pertaining to a fourth embodiment. This embodiment features a design implemented in a tank opening-closing device comprising a closure member detachably supported on a tank opening forming member, with a gasket interposed therebetween. The tank opening-closing device 100 has a design whereby a valve opening-closing mechanism 120 (closure member) having a pressure regulating function is rotatably supported on the tank opening forming member 111 by a retracting mechanism 130. Specifically, the tank opening forming member 111 is of pipe shape having an upper wall 111a and a side wall 111b of tubular shape formed at the peripheral portion of the upper wall 111a; an inlet 112P (tank opening) is formed in the upper wall 111a. As shown in FIG. 8, a seal retaining portion 111c is formed at the rim of the mouth of the inlet 112P with the gasket GS-2 being retained therein. The gasket GS-2 has an assist rib GSf-2 formed on a gasket body GSa-2.

In FIG. 7, the valve opening-closing mechanism 120 comprises a valve body 122, a valve support moving body 124, a spring 126, and a valve restricting body 128. The valve body 122 comprises a push portion 122a adapted to be pushed by the fuel gun, a seal face 122b formed on the outside periphery of the push portion 122a, and a side wall 122c extending in round tubular shape from the outside peripheral portion of the seal face 122b, thereby forming an inverted cup shape. The valve support moving body 124 comprises a side wall 124a and a base wall 124b formed at the bottom of the side wall 124a, thereby forming an upright cup shape, the space inside of which constitutes a valve housing chamber 124c. A passage hole 124d connecting the valve housing chamber 124c with a fuel passageway 111P is formed in the base wall 124b. The spring 126 is supported on the base wall 124b and urges the valve body 122 towards the closed position. The valve restricting body 128 is housed within the valve housing chamber 124c; it slidably retains the valve body 122, as well as being furnished with an engaging claw 128a. The engaging claw 128a is engaged by a notch 122e formed in the side wall 122c, preventing the valve body 122 from becoming dislodged.

The retracting mechanism 130 comprises a rotating support portion 124f formed on the outside wall of the side wall 124a, a shaft support portion 131 formed in the inside wall of the tank opening forming member 111, and a spring 132 supported on the shaft support portion 131. The valve opening-closing mechanism 120 is rotatably supported with respect to the tank opening forming member 111 via the shaft support portion 131 and the rotating support portion 124f of the valve support moving body 124, and is urged in the direction of the inlet 112P by the spring 132.

Figure 9:
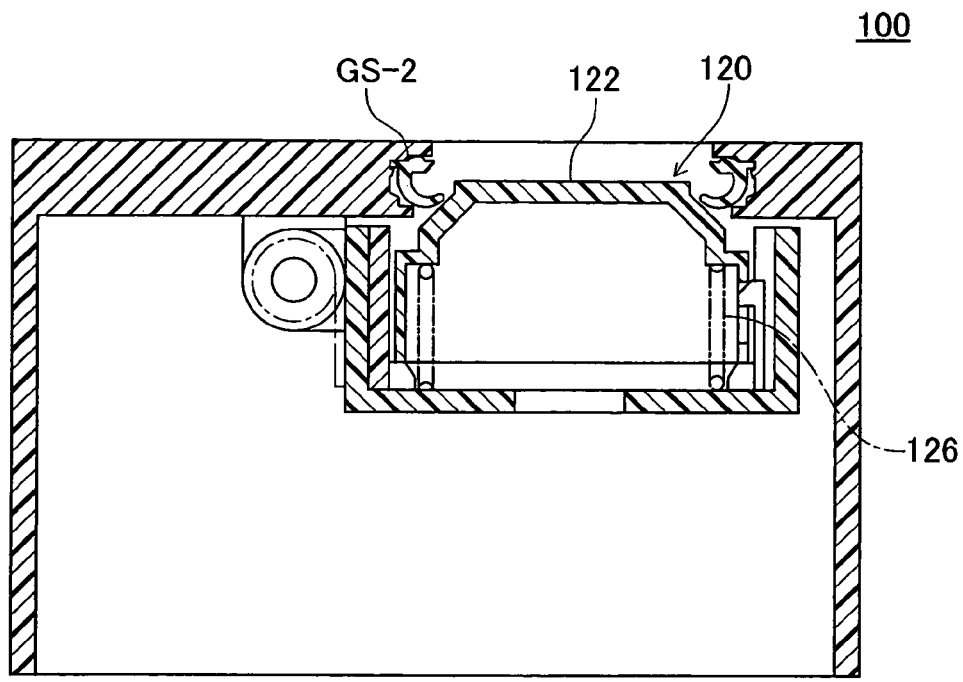
FIG. 9 shows the operation of a valve opening-closing mechanism.

Pressure regulation by the valve opening-closing mechanism 120 is carried out as follows. With the valve opening-closing mechanism 120 in the closed state of FIG. 7, if the relationship of force applied to the valve body 122 of the valve opening-closing mechanism 120, that is, the balance of force in the opening direction produced by atmospheric pressure versus force in the closing direction produced by pressure in the tank and the spring force of the spring 126, is such that there results a negative pressure condition in which the formed exceeds the latter, as depicted in FIG. 9 the valve body 122 will move downward in opposition to the urging force of the spring 126 and will move away from the gasket GS-2, thereby ensuring an air passage between them. The fuel tank now communicates with the atmosphere through this passage, and air flows in the direction of eliminating the negative pressure condition within the fuel tank. Subsequently, when the pressure differential applied to the valve body 122 falls below the urging force of the spring 126, the valve body 122 closes.

Figure 10:
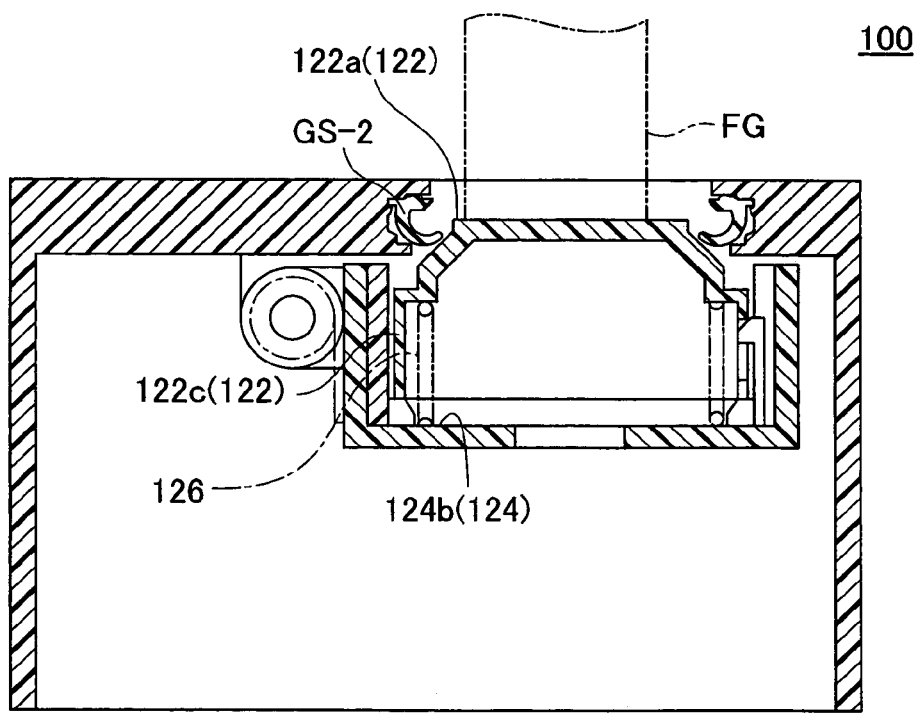
FIG. 10 shows the opening-closing operation of a tank opening-closing device.
Figure 11:
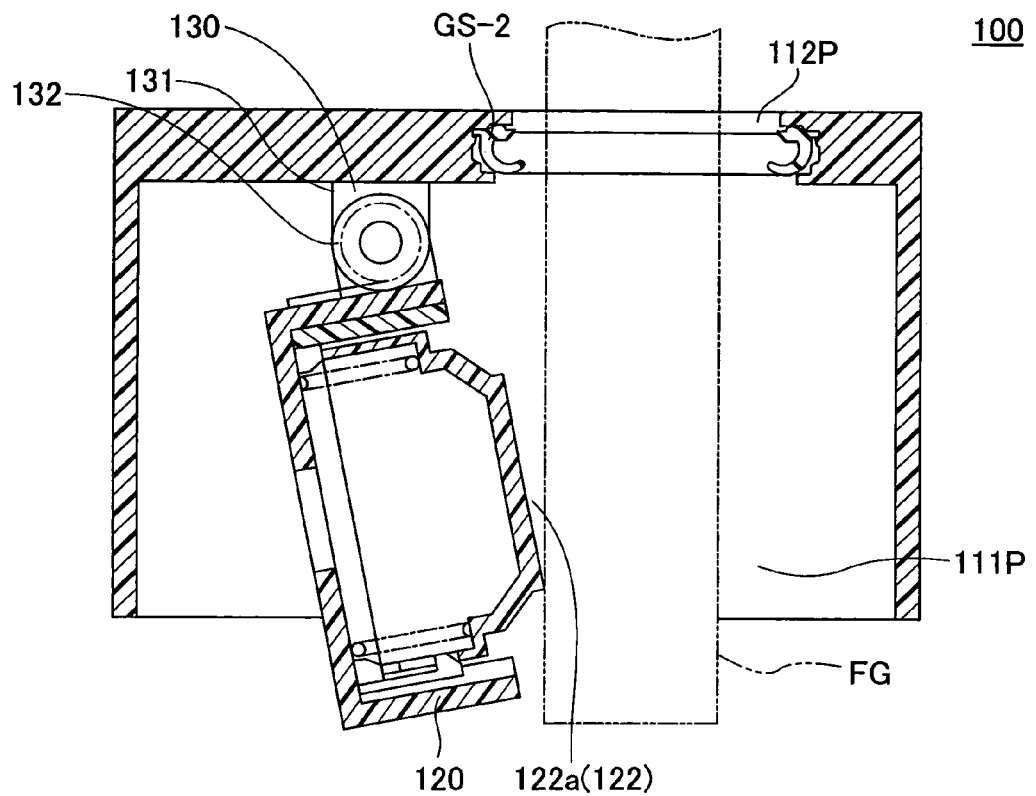
FIG. 11 shows continuing on from FIG. 10, depicting opening-closing operation.

Supply of fuel by means of the tank opening-closing device 100 is carried out as follows. As shown in FIG. 10, when the fuel gun FG pushes the push portion 122a of the valve body 122, the valve body 122 is pushed downward in opposition to the spring force of the spring 126, and when the base portion of the side wall 122c comes into abutment against the base wall 124b of the valve support moving body 124, movement of the valve body 122 is now restricted. As shown in FIG. 11, as the fuel gun FG pushes the push portion 122a further, the valve body 122 rotates about the shaft support portion 131 of the retracting mechanism 130 in opposition to the spring force of the spring 132, allowing the fuel gun FG to be inserted into the fuel passageway 111P; in this state, the fuel is supplied. At this time the gasket GS-2 passes through the states depicted in FIG. 3C and FIG. 3B, returning to the uncompressed state as shown in FIG. 3A. When the fuel gun FG is subsequently withdrawn, the spring force of the spring 132 of the retracting mechanism 130 applied to the valve opening-closing mechanism 120 now closes the inlet 112P. In the course of this closing operation, the gasket GS-2 undergoes elastic deformation through the states depicted in FIG. 3A and FIG. 3B to the state shown in FIG. 3C.

Figure 12:
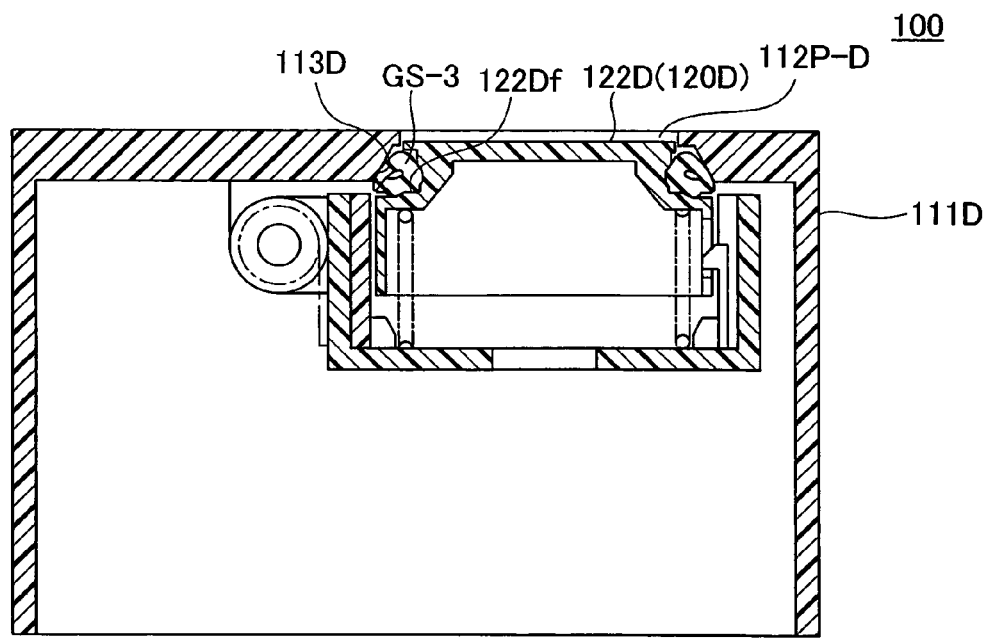
FIG. 12 is a sectional view showing the tank opening-closing device pertaining to a fifth embodiment.
Figure 13:
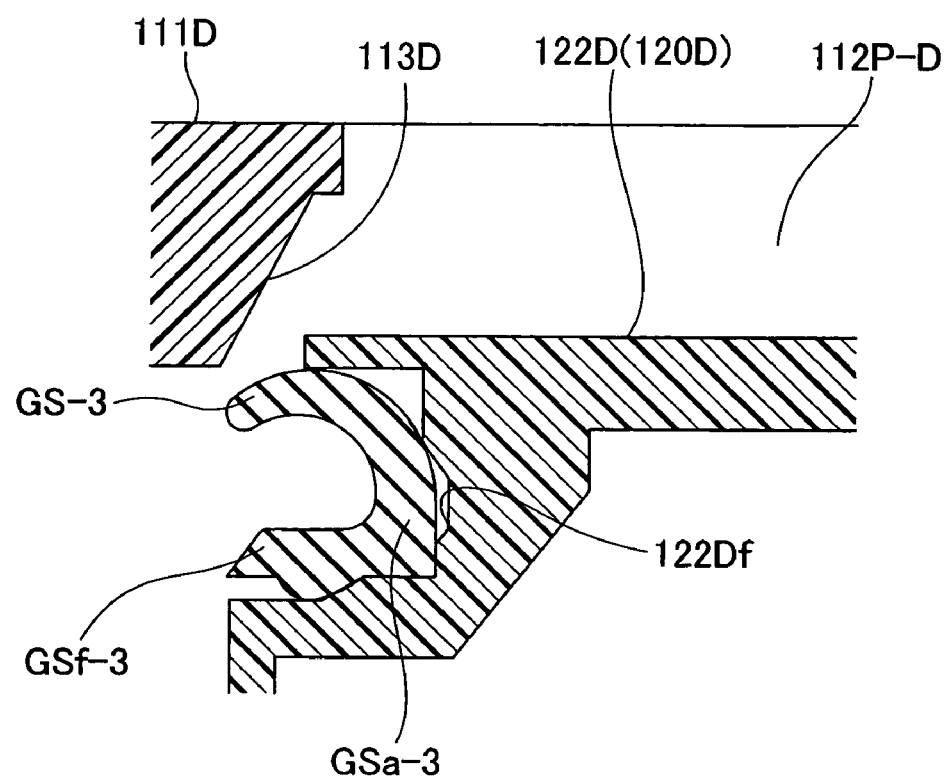
FIG. 13 is an enlarged sectional view showing the area around the gasket.

FIG. 12 is a sectional view showing a tank opening-closing device pertaining to a modified example of the embodiment in FIG. 7. The embodiment features a design in which the gasket GS-3 is installed on the valve body 122D of the valve opening-closing mechanism 120D. Specifically, as illustrated in FIG. 13, a seal retaining portion 122Df is formed on the outside peripheral portion of the valve body 122D, and the gasket GS-3 is retained in this seal retaining portion 122Df. The gasket GS-3 has an assist rib GSf-3 projecting from a gasket body GSa-3. On the tank opening forming member 111D is formed a seal face 113D situated at the rim of the mouth of the inlet 112P-D facing the gasket GS-3. In this way, the member for retaining the gasket can be either the valve body or the rim of the mouth of the inlet.

E. Other Embodiments

The invention is not limited to the embodiments discussed above, and may be reduced to practice in various other forms without departing from the spirit thereof, such as the following modifications, for example.

(1) While the fuel cap is designed by means of rotation thereof to apply twisting force to the gasket, a design whereby closure is effected through operating force in the vertical direction would be acceptable as well, as long as force is applied in the deflection direction (direction of the rotation axis).

(2) The tank employing the gasket is not limited to a fuel tank, and may be a tank apparatus for storing some other liquid.

(3) The material of the gasket is not limited to the fluororubber mentioned above, and various other types of materials may be used, such as NBR/PVC or other elastomers.

(4) In the tank opening-closing device shown in FIG. 7 and FIG. 12 above, the gasket is interposed between the seal face and the valve body of a valve opening-closing mechanism having a pressure regulating function; however, the invention is not limited thereto, and may be implemented for a flap valve lacking a pressure regulating function.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. An annular gasket that is pressed between a seal retaining portion which holds the gasket, and a seal face of a tank opening forming member, the gasket comprising:
    a gasket body having a first lip pressed by the seal face, a second lip pressed by the seal retaining portion, and a connecting portion integrally connecting the first lip with the second lip, wherein the gasket body is substantially C-shaped in cross-section, and wherein the connecting portion includes an inside peripheral portion, the first lip includes an inside peripheral portion, and the second lip includes an inside peripheral portion; and
    an assist rib projecting from the inside peripheral portion of the second lip toward the inside peripheral portion of the first lip, wherein the assist rib has a pressing face formed substantially parallel to the seal face, the assist rib is configured such that the pressing face presses and elastically deforms the inside peripheral portion of the first lip, and then a distal edge of the first lip comes into contact with the seal face when the gasket body is compressed between the seal retaining portion and the seal face, and wherein the assist rib is provided with air channels for venting air.

2. The gasket in accordance with claim 1, wherein the assist rib is a separate member from the gasket body.

3. The gasket in accordance with claim 1, wherein the pressing face generally is shaped like a surface of a section of a cone.

4. A tank -opening-closing device comprising
    (i) a tank opening forming member that has a tank opening and a seal face formed on a periphery of the tank opening,
    (ii) an opening-closing member that opens and closes the tank opening and a seal retaining portion, and
    (iii) an annular gasket that is held on the seal retaining portion, wherein the gasket includes:
    a gasket body having a first lip pressed by the seal face,
    a second lip pressed by the seal retaining portion, and
    a connecting portion integrally connecting the first lip with the second lip, wherein the gasket body is substantially C-shaped in cross section, and wherein the connecting portion includes an inside peripheral portion, the first lip includes an inside peripheral portion, and the second lip includes an inside peripheral portion; and
    an assist rib projecting from the inside peripheral portion of the second lip toward the inside peripheral portion of the first lip, wherein the assist rib has a pressing face formed substantially parallel to the seal face, the assist rib is configured such that the pressing face presses and elastically deforms the inside peripheral portion of the first lip, and then a distal edge of the first lip comes into contact with the seal face when the gasket body is compressed between the seal retaining portion and the seal face, and wherein the assist rib is provided with air channels for venting air.

5. The tank opening-closing device in accordance with claim 4, wherein the connecting portion and the seal retaining portion is disposed with a gap that permits radial direction deformation of the gasket body.

6. The tank opening-closing device in accordance with claim 4, wherein the opening-closing member is a that cap that is detachable from the tank opening forming member.

7. The tank opening-closing device in accordance with claim 4, wherein the opening-closing member is a valve opening-closing mechanism that is pivoted at the tank opening forming member to open and close the tank opening.

8. The gasket in accordance with claim 4, wherein the pressing face generally is shaped like a surface of a section of a cone.

9. A tank opening-closing device comprising
    (i) a tank opening forming member that has a tank opening and a seal retaining portion formed on a periphery of the tank opening,
    (ii) an opening-closing member that opens and closes the tank opening and a seal face, and
    (iii) an annular gasket that is held on the seal retaining portion, wherein the gasket includes:
    a gasket body having a first lip pressed by the seal face,
    a second lip pressed by the seal retaining portion, and
    a connecting portion integrally connecting the first lip with the second lip, wherein the gasket body is substantially C-shaped in cross section, and wherein the connecting portion includes an inside peripheral portion, the first lip includes an inside peripheral portion, and the second lip includes an inside peripheral portion; and
    an assist rib projecting from the inside peripheral portion of the second lip toward the inside peripheral portion of the first lip, wherein the assist rib has a pressing face formed substantially parallel to the seal face, the assist rib is configured such that the pressing face presses and elastically deforms the inside peripheral portion of the first lip, and then a distal edge of the first lip comes into contact with the seal face when the gasket body is compressed between the seal retaining portion and the seal face, and wherein the assist rib is provided with air channels for venting air.

10. The tank opening-closing device in accordance with claim 9, wherein the opening-closing member is a valve opening-closing mechanism that is pivoted at the tank opening forming member to open and close the tank opening.

11. The gasket in accordance with claim 9, wherein the pressing face generally is shaped like a surface of a section of a cone.

* * * * *